(12) United States Patent
Lee et al.

(10) Patent No.: US 10,761,361 B2
(45) Date of Patent: Sep. 1, 2020

(54) LIQUID CRYSTAL DISPLAY DEVICE INCLUDING LIQUID CRYSTAL CAPSULE AND METHOD OF FABRICATING THE SAME

(71) Applicant: LG DISPLAY CO., LTD., Seoul (KR)

(72) Inventors: Eun-Woo Lee, Paju-si (KR); Min-Geun Choi, Paju-si (KR); Jung-Im Hwang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/189,255

(22) Filed: Nov. 13, 2018

(65) Prior Publication Data

US 2019/0155073 A1 May 23, 2019

(30) Foreign Application Priority Data

Nov. 20, 2017 (KR) ........................ 10-2017-0155011

(51) Int. Cl.
| | |
|---|---|
| *G02F 1/1334* | (2006.01) |
| *G02F 1/1343* | (2006.01) |
| *G02F 1/1333* | (2006.01) |
| *G02F 1/1335* | (2006.01) |
| *G02F 1/1362* | (2006.01) |

(52) U.S. Cl.
CPC ...... *G02F 1/1334* (2013.01); *G02F 1/133345* (2013.01); *G02F 1/133512* (2013.01); *G02F 1/133514* (2013.01); *G02F 1/133528* (2013.01); *G02F 1/134309* (2013.01); *G02F 1/136286* (2013.01); *G02F 2201/121* (2013.01); *G02F 2201/123* (2013.01); *G02F 2201/50* (2013.01); *G02F 2202/28* (2013.01); *G02F 2202/36* (2013.01)

(58) Field of Classification Search
CPC .................................................... G02F 1/1334
See application file for complete search history.

(56) References Cited

U.S. PATENT DOCUMENTS

2016/0011443 A1\* 1/2016 Jeon ................. G02F 1/133634
349/43

FOREIGN PATENT DOCUMENTS

KR     10-2016-0027552 A     3/2016

\* cited by examiner

*Primary Examiner* — James A Dudek
(74) *Attorney, Agent, or Firm* — Polsinelli PC

(57) ABSTRACT

A liquid crystal display device includes: a substrate having first, second and third sub-pixels; a thin film transistor in each of the first, second and third sub-pixels on a front surface of the substrate; a pixel electrode and a common electrode in each of the first, second and third sub-pixels on the substrate, the pixel electrode and the common electrode spaced apart from each other; a liquid crystal layer on the pixel electrode and the common electrode, the liquid crystal layer including a liquid crystal capsule and a binder; an auxiliary adhesive layer on the liquid crystal layer; an optical film on the auxiliary adhesive layer; a first adhesive layer and a first polarizing plate sequentially on a rear surface of the substrate; and a second adhesive layer and a second polarizing plate sequentially on the optical film.

12 Claims, 6 Drawing Sheets

210

LIQUID CRYSTAL DISPLAY DEVICE INCLUDING LIQUID CRYSTAL CAPSULE AND METHOD OF FABRICATING THE SAME

CROSS-REFERENCE TO RELATED APPLICATION

This application claims the benefit of priority of Korean Patent Application No. 10-2017-0155011, filed in the Republic of Korea on Nov. 20, 2017, which is hereby incorporated by reference in its entirety for all purposes as if fully set forth herein.

BACKGROUND

Field of the Disclosure

The present disclosure relates to a liquid crystal display device, and more particularly, to a liquid crystal display device where a generation of a bubble is prevented and a rework is improved by attaching an array substrate having a thin film transistor and an optical film having an auxiliary adhesive layer and a liquid crystal layer and a method of fabricating the same.

Description of the Background

Recently, as the information age progresses, display devices processing and displaying a large amount of information have rapidly advanced. For example, various flat panel displays (FPDs) having a thin profile, a light weight and a low power consumption have been researched.

As a result, a thin film transistor liquid crystal display (TFT-LCD) device having an excellent color reproducibility and a thin profile has been developed. The LCD device displays an image using an optical anisotropy and a polarization property of a liquid crystal molecule.

In general, the LCD device includes first and second substrates facing and spaced apart from each other and a liquid crystal layer between the first and second substrates. Since the LCD device includes two glass substrates, the LCD device has a relatively heavy weight and is relatively bulky and it is not easy to apply the LCD device to a flexible display device.

To improve the above disadvantages of the LCD device, an LCD device including a liquid crystal capsule where a liquid crystal layer including a plurality of liquid crystal capsules is formed on a substrate through a coating method has been suggested. The LCD device including a liquid crystal capsule displays a gray level by changing an effective refractive index anisotropy (or an average refractive index anisotropy) according to an electric field.

FIGS. 1A and 1B are cross-sectional views showing a method of fabricating a liquid crystal display device including a liquid crystal capsule according to the related art.

In FIG. 1A, a substrate 20 includes red, green and blue sub-pixels SPr, SPg and SPb, and a thin film transistor (TFT) T, a pixel electrode 38 and a common electrode 40 are formed in each of the red, green and blue sub-pixels SPr, SPg and SPb on the substrate 20.

A gate electrode 22 is formed in each of the red, green and blue sub-pixels SPr, SPg and SPb on the substrate 20, and a gate insulating layer 24 is formed on the gate electrode 22 in a whole of the substrate 20.

A semiconductor layer 26 is formed on the gate insulating layer 24 corresponding to the gate electrode 22, and a source electrode 28 and a drain electrode 30 are formed on both end portions of the semiconductor layer 26.

The gate electrode 22, the semiconductor layer 26, the source electrode 28 and the drain electrode 30 constitute the TFT T.

A passivation layer 32 is formed on the TFT T in a whole of the substrate 20, and a black matrix 34 is formed at a boundary portion of the red, green and blue sub-pixels SPr, SPg and SPb on the passivation layer 32.

Red, green and blue color filters 36r, 36g and 36b are formed in the red, green and blue sub-pixels SPr, SPg and SPb, respectively, on the black matrix 34. The red, green and blue color filters 36r, 36g and 36b constitute a color filter layer.

A pixel electrode 38 and a common electrode 40 are formed in each of the red, green and blue sub-pixels SPr, SPg and SPb on the color filter layer. The pixel electrode 38 is connected to the drain electrode 30 of the TFT T, and the common electrode 40 is spaced apart from the pixel electrode 38.

In addition, after a liquid crystal capsule material layer 82 is formed on the substrate 20 having the TFT T, the pixel electrode 38 and the common electrode 40 by coating a liquid crystal capsule solution including a liquid crystal capsule 52 and a binder 54 through a nozzle 80, the liquid crystal capsule material layer 82 are dried or cured to form a liquid crystal layer 50 including the liquid crystal capsule 52 on the substrate 20.

In FIG. 1B, a liquid crystal display (LCD) device 10 including a liquid crystal capsule according to the related art is completed by sequentially forming a first adhesive layer 70 and a first polarizing plate 72 under the substrate 20 and sequentially forming a second adhesive layer 74 and a second polarizing plate 76 on the liquid crystal layer 50.

In the LCD device 10 including a liquid crystal capsule, since the second adhesive layer 74 is directly formed on the liquid crystal layer 50, the liquid crystal layer 50 may be deteriorated by an adhesive material of the second adhesive layer 74.

For example, a distribution of the liquid crystal capsule 52 of an upper portion of the liquid crystal layer 50 may become non-uniform due to diffusion of the adhesive material of the second adhesive layer 74 to the upper portion of the liquid crystal layer 50.

In addition, an adjustment of a concentration of a solid in the liquid crystal capsule solution is required to apply the liquid crystal layer 50 including the liquid crystal capsule 52 to the LCD device 10 using the substrate 20 of the other kind. However, a condition such as the concentration of the solid may not be easily changed and a thickness of the liquid crystal layer 50 may not be easily maintained.

Further, when the second polarizing plate 76 is attached to the liquid crystal layer 50 through the second adhesive layer 74, an absorption axis of the second polarizing plate 76 may be misaligned. When the absorption axis of the second polarizing plate 76 is misaligned, the second polarizing plate 76 is removed and then a rework of attaching the second polarizing plate 76 is required. However, the liquid crystal layer 50 may be deteriorated during the rework.

FIG. 2 is a cross-sectional view showing a rework of a liquid crystal display device including a liquid crystal capsule according to the related art. Reference is made to FIGS. 1A and 1B with FIG. 2.

In FIG. 2, when the second polarizing plate 76 attached to the liquid crystal layer 50 through the second adhesive layer 74 is misaligned, the misaligned second polarizing plate 76 is removed from the substrate 20 including the liquid crystal layer 50 and then the new second polarizing plate 76 is attached to a top surface of the liquid crystal layer 50 again.

However, since a viscosity of the liquid crystal layer including the liquid crystal capsule 52 is similar to a viscosity of the second adhesive layer 74, the second adhesive layer 74 and the second polarizing plate 76 may not be removed and the liquid crystal layer 50 may be removed or deteriorated during the rework of removing the second polarizing plate 76 from the substrate 20 including the liquid crystal layer 50. As a result, the rework becomes impossible and a fabrication cost inevitably increases.

SUMMARY

Accordingly, aspects of the present disclosure are directed to a liquid crystal display device including a liquid crystal capsule and a method of fabricating the same that substantially obviate one or more of the problems due to limitations and disadvantages of the related art.

Aspects of the present disclosure relate to a liquid crystal display device including a liquid crystal capsule where deterioration of a liquid crystal layer and remaining of a bubble are prevented and a fabrication cost is reduced.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a liquid crystal display device includes: a substrate having first, second and third sub-pixels; a thin film transistor in each of the first, second and third sub-pixels on a front surface of the substrate; a pixel electrode and a common electrode in each of the first, second and third sub-pixels on the substrate, the pixel electrode and the common electrode spaced apart from each other; a liquid crystal layer on the pixel electrode and the common electrode, the liquid crystal layer including a liquid crystal capsule and a binder; an auxiliary adhesive layer on the liquid crystal layer; an optical film on the auxiliary adhesive layer; a first adhesive layer and a first polarizing plate sequentially on a rear surface of the substrate; and a second adhesive layer and a second polarizing plate sequentially on the optical film.

In another aspect, a method of fabricating a liquid crystal display device includes: forming a thin film transistor, a pixel electrode and a common electrode in each of first, second and third sub-pixels on a front surface of a substrate, the pixel electrode and the common electrode spaced apart from each other; sequentially forming an auxiliary adhesive layer and a liquid crystal layer on an optical film; attaching the substrate and the optical film such that the pixel electrode and the common electrode contact the liquid crystal layer; and sequentially forming a first adhesive layer and a first polarizing plate on a rear surface of the substrate and sequentially forming a second adhesive layer and a second polarizing plate on the optical film.

It is to be understood that both the foregoing general description and the following detailed description are explanatory, and are intended to provide further explanation of the aspects as claimed.

BRIEF DESCRIPTION OF THE DRAWINGS

The accompanying drawings, which are included to provide a further understanding of the disclosure, are incorporated in and constitute a part of this application, illustrate aspects of the disclosure and together with the description serve to explain the principles of the disclosure.

In the drawings.

DETAILED DESCRIPTION

Figure 1A:
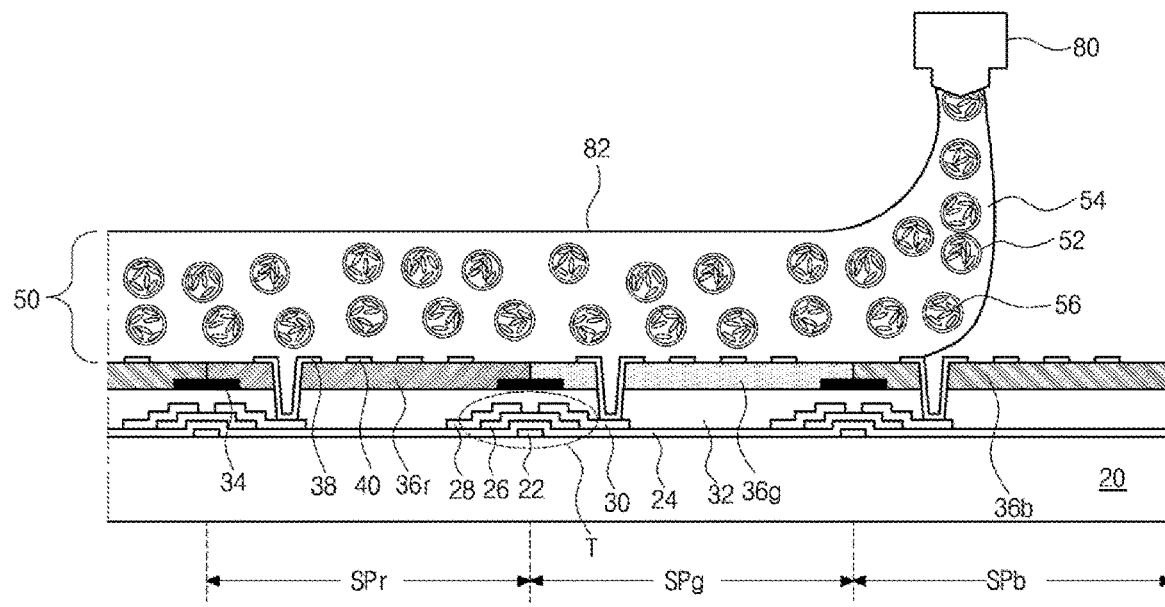
FIGS. 1A and 1B are cross-sectional views showing a method of fabricating a liquid crystal display device including a liquid crystal capsule according to the related art.
Figure 1B:
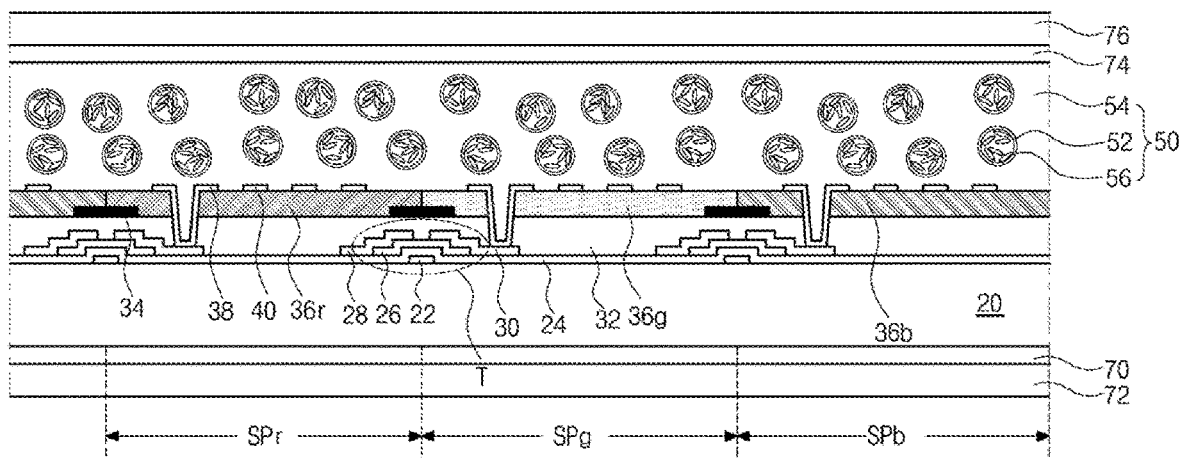
Figure 2:
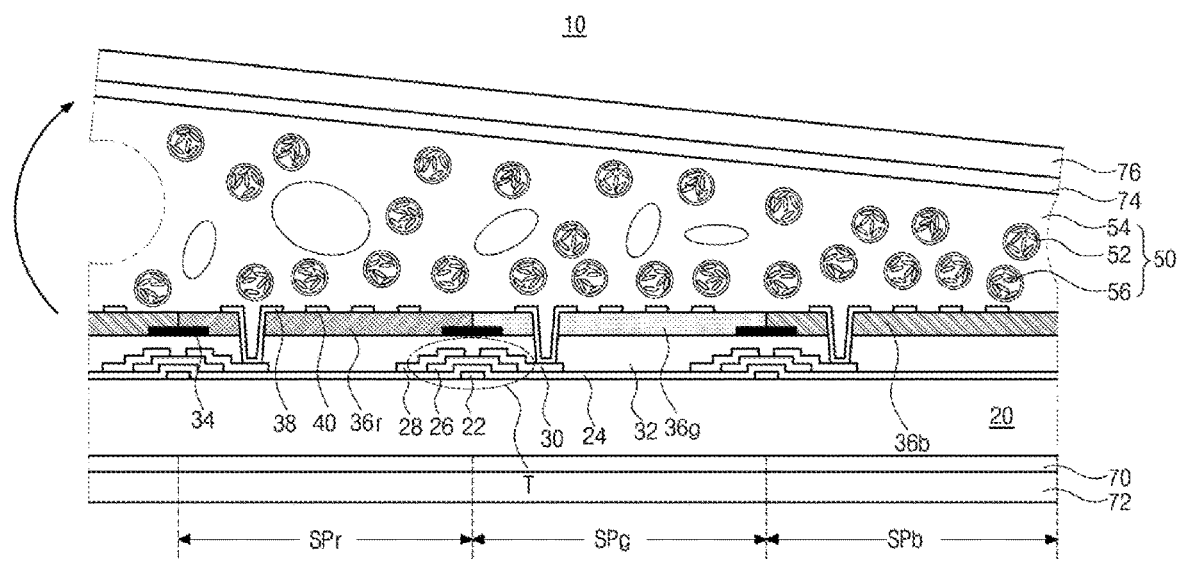
FIG. 2 is a cross-sectional view showing a rework of a liquid crystal display device including a liquid crystal capsule according to the related art.

Reference will now be made in detail to aspects of the present disclosure, examples of which are illustrated in the accompanying drawings. In the following description, when a detailed description of well-known functions or configurations related to this document is determined to unnecessarily cloud a gist of an aspect of the disclosure, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

Figure 3:
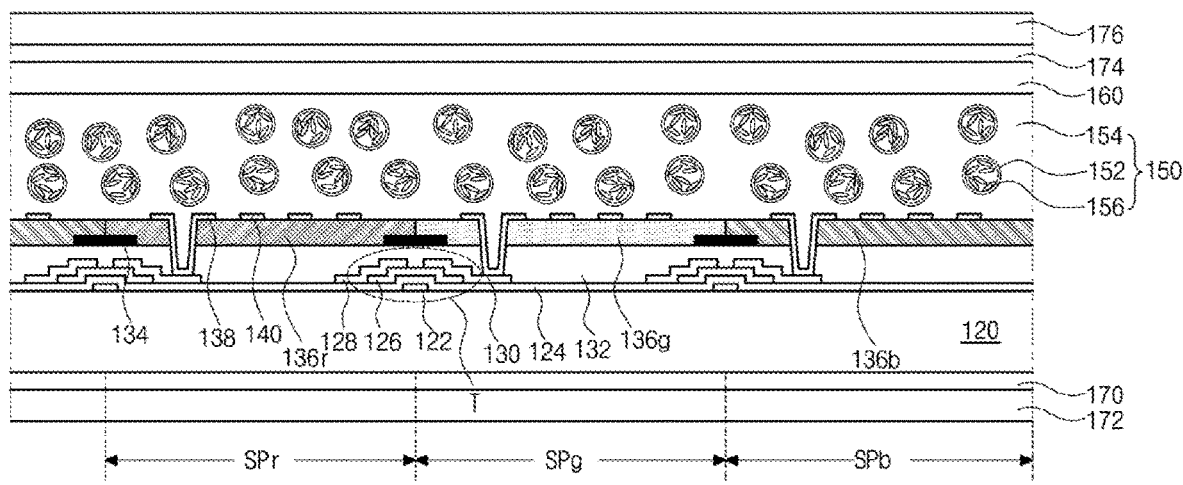
FIG. 3 is a cross-sectional view showing a liquid crystal display device including a liquid crystal capsule according to a first aspect of the present disclosure.

FIG. 3 is a cross-sectional view showing a liquid crystal display device including a liquid crystal capsule according to a first aspect of the present disclosure.

In FIG. 3, a liquid crystal display (LCD) device 110 including a liquid crystal capsule according to a first aspect of the present disclosure includes a substrate 120 and a liquid crystal layer 150 on the substrate 120.

The substrate 120 includes first, second and third sub-pixels SPr, SPg and SPb. The first, second and third sub-pixels SPr, SPg and SPb may correspond to red, green and blue, respectively or cyan, magenta and yellow, respectively.

The substrate 120 may include a glass or a flexible material such as plastic.

A gate electrode 122 is formed in each of the first, second and third sub-pixels SPr, SPg and SPb on the substrate 120, and a gate insulating layer 124 is formed on the gate electrode 122 including the substrate 120.

A semiconductor layer 126 is formed on the gate insulating layer 124 corresponding to the gate electrode 122, and a source electrode 128 and a drain electrode 130 are disposed on both end portions of the semiconductor layer 126.

The gate electrode 122, the semiconductor layer 126, the source electrode 128 and the drain electrode 130 constitute a thin film transistor (TFT) T.

Although not shown, a gate line and a data line are disposed over the substrate 120. The gate line and the data line cross each other to define the first, second and third sub-pixels SPr, SPg and SPb. The gate electrode 122 of the TFT T may be connected to the gate line and the source electrode 128 of the TFT T may be connected to the data line.

A passivation layer 132 is disposed on the TFT Tin a whole of the substrate 120, and a black matrix 134 is disposed at a boundary portion of the first, second and third sub-pixels SPr, SPg and SPb on the passivation layer 132.

Red, green and blue color filters 136r, 136g and 136b are disposed in the red, green and blue sub-pixels SPr, SPg and SPb, respectively, on the black matrix 134. The red, green and blue color filters 136r, 136g and 136b constitute a color filter layer.

A pixel electrode 138 and a common electrode 140 are disposed in each of the first, second and third sub-pixels SPr, SPg and SPb on the color filter layer. The pixel electrode 138 is connected to the drain electrode 130 of the TFT T through a drain contact hole of the color filter layer and the passivation layer 132. The common electrode 140 is spaced apart from the pixel electrode 138.

Although not shown, each of the pixel electrode 138 and the common electrode 140 may have a bar shape and may include a plurality of bars parallel to and spaced apart from each other in each of the first, second and third sub-pixels SPr, SPg and SPb.

The liquid crystal layer 150 is formed on the pixel electrode 138 and the common electrode 140 in a whole of the substrate 120.

The liquid crystal layer 150 includes a plurality of liquid crystal capsules 152 and a binder 154 where the plurality of liquid crystal capsules 152 is dispersed. Each of the plurality of liquid crystal capsules 152 includes a plurality of liquid crystal molecules 156, and the binder 154 includes an adhesive material (not shown).

A thickness of the liquid crystal layer 150 may be changed according to a birefringence property and an optical transmittance of the liquid crystal capsule 152. For example, the thickness of the liquid crystal layer 150 may be within a range of about 2 μm to about 6 μm.

The binder 154 disperses the liquid crystal capsule 152 and fixes the liquid crystal layer 150 to the substrate 120.

Each of the plurality of liquid crystal capsules 152 is a polymer capsule having a diameter of 1 to 999 nanometers and includes a water soluble material such as poly vinyl alcohol (PVA) or a fat soluble material such as poly methyl methacrylate (PMMA). For example, each of the plurality of liquid crystal capsules 152 may be within a range of about 1 nm to about 320 nm.

The binder 154 may be transparent or translucent (half-transparent) and may have a water solubility, a fat solubility or a mixed property of a water solubility and a fat solubility. For example, the binder 154 may include a water solubility which has a small influence on the liquid crystal capsule 152.

The plurality of liquid crystal molecules 156 may include at least one of a nematic liquid crystal, a ferroelectric liquid crystal and a flexo electric liquid crystal.

Since the liquid crystal layer 150 including the plurality of liquid crystal capsules 152 and the binder 156 may be formed without an additional orientation layer, the liquid crystal layer 150 may directly contact the pixel electrode 138 and the common electrode 140.

An optical film 160 is formed on the liquid crystal layer 150. The optical film 160 protects the liquid crystal layer 150 including the liquid crystal capsule 152 and may have an optical function.

For example, the optical film 160 may include one of triacetyl cellulose (TAC) and cyclic olefin copolymer (COC) having an optical isotropy without a retardation.

In another aspect, the optical film 160 may include a material capable of compensating a birefringence property of the liquid crystal layer 150.

A first adhesive layer 170 and a first polarizing plate 172 are sequentially formed under the substrate 120, and a second adhesive layer 174 and a second polarizing plate 176 are sequentially formed on the liquid crystal layer 150.

The LCD device 110 may be fabricated through the following process.

The TFT T, the color filter layer, the pixel electrode 138 and the common electrode 140 are formed on the substrate 120. The liquid crystal capsule solution is coated on the optical film 160 and then is dried or cured to form the liquid crystal layer 150. The LCD device 110 is completed by attaching the substrate 120 having the TFT T, the color filter layer, the pixel electrode 138 and the common electrode 140 and the optical film having the liquid crystal layer 150 and by attaching the first and second polarizing plates 172 and 176 to the substrate 120 and the optical film 160 through the first and second adhesive layers 170 and 174.

In the LCD device 110 including the liquid crystal capsule according to the first aspect of the present disclosure, since the optical film 160 on the liquid crystal layer 150 protects the liquid crystal layer 150, deterioration of the liquid crystal layer 150 due to the adhesive material of the second adhesive layer 174 is prevented.

In addition, after the liquid crystal capsule solution is formed on the optical film 160, the optical film 160 is attached to various kinds of substrate 120. As a result, a condition change of the liquid crystal capsule solution is not required and the thickness of the liquid crystal layer 150 may be kept uniformly.

In the LCD device 110 including the liquid crystal capsule according to the first aspect of the present disclosure, however, since the liquid crystal layer 150 has a relatively small thickness, a bubble may remain in an interface between the pixel electrode 138 and the liquid crystal layer 150 and an interface between the common electrode 140 and the liquid crystal layer 150 when the substrate 120 having the TFT T, the color filter layer, the pixel electrode 138 and the common electrode 140 and the optical film having the liquid crystal layer 150 are attached.

In another aspect, remaining of a bubble may be prevented by forming an auxiliary adhesive layer between the liquid crystal layer and the optical film.

Figure 4:
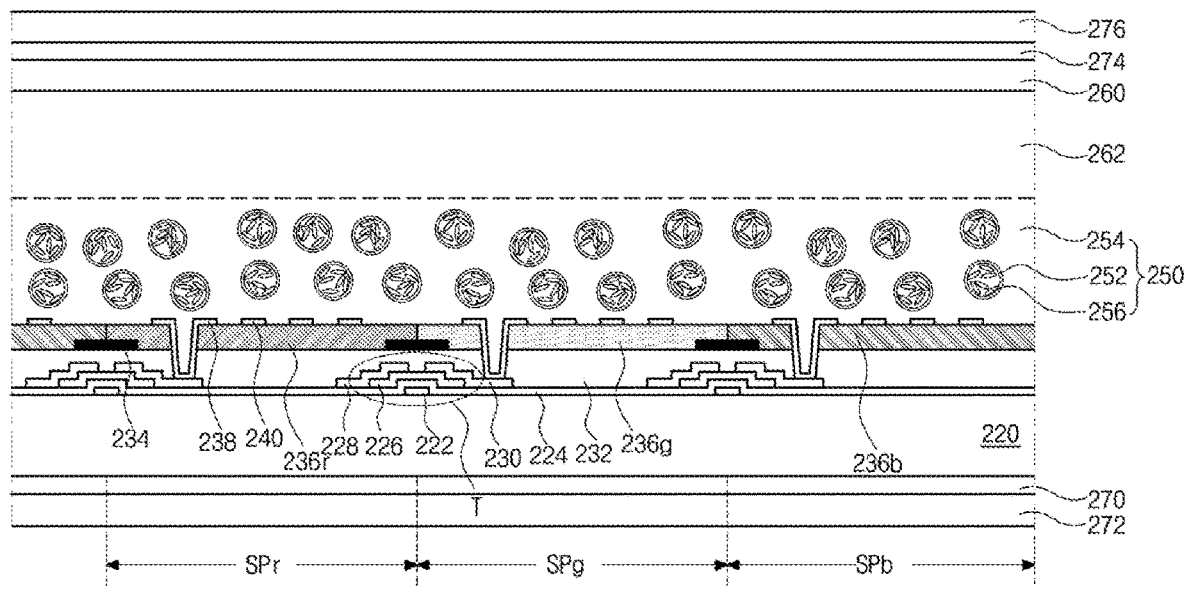
FIG. 4 is a cross-sectional view showing a liquid crystal display device including a liquid crystal capsule according to a second aspect of the present disclosure.

FIG. 4 is a cross-sectional view showing a liquid crystal display device including a liquid crystal capsule according to a second aspect of the present disclosure.

In FIG. 4, a liquid crystal display (LCD) device 210 including a liquid crystal capsule according to a second aspect of the present disclosure includes a substrate 220 and a liquid crystal layer 250 on the substrate 220.

The substrate 220 includes first, second and third sub-pixels SPr, SPg and SPb. The first, second and third sub-pixels SPr, SPg and SPb may correspond to red, green and blue, respectively or cyan, magenta and yellow, respectively.

The substrate 220 may include a glass or a flexible material such as plastic.

A gate electrode 222 is formed in each of the first, second and third sub-pixels SPr, SPg and SPb on the substrate 220, and a gate insulating layer 224 is formed on the gate electrode 222 in a whole of the substrate 220.

A semiconductor layer 226 is formed on the gate insulating layer 224 corresponding to the gate electrode 222, and a source electrode 228 and a drain electrode 230 are disposed on both end portions of the semiconductor layer 226.

The gate electrode 222, the semiconductor layer 226, the source electrode 228 and the drain electrode 230 constitute a thin film transistor (TFT) T.

Although not shown, a gate line and a data line are disposed over the substrate 220. The gate line and the data line cross each other to define the first, second and third sub-pixels SPr, SPg and SPb. The gate electrode 222 of the TFT T may be connected to the gate line and the source electrode 228 of the TFT T may be connected to the data line.

A passivation layer 232 is disposed on the TFT T in a whole of the substrate 220, and a black matrix 234 is disposed at a boundary portion of the first, second and third sub-pixels SPr, SPg and SPb on the passivation layer 232.

Red, green and blue color filters 236r, 236g and 236b are disposed in the red, green and blue sub-pixels SPr, SPg and SPb, respectively, on the black matrix 234. The red, green and blue color filters 236r, 236g and 236b constitute a color filter layer.

A pixel electrode 238 and a common electrode 240 are disposed in each of the first, second and third sub-pixels SPr, SPg and SPb on the color filter layer. The pixel electrode 238 is connected to the drain electrode 230 of the TFT T through a drain contact hole of the color filter layer and the passivation layer 232. The common electrode 240 is spaced apart from the pixel electrode 238.

Although not shown, each of the pixel electrode 238 and the common electrode 240 may have a bar shape and may include a plurality of bars parallel to and spaced apart from each other in each of the first, second and third sub-pixels SPr, SPg and SPb.

The liquid crystal layer 250 is formed on the pixel electrode 238 and the common electrode 240 in a whole of the substrate 220.

The liquid crystal layer 250 includes a plurality of liquid crystal capsules 252 and a binder 254 where the plurality of liquid crystal capsules 252 is dispersed. Each of the plurality of liquid crystal capsules 252 includes a plurality of liquid crystal molecules 256, and the binder 254 includes an adhesive material (not shown).

A thickness of the liquid crystal layer 250 may be changed according to a birefringence property and an optical transmittance of the liquid crystal capsule 252. For example, the thickness of the liquid crystal layer 250 may be within a range of about 2 μm to about 6 μm.

The binder 254 disperses the liquid crystal capsule 252 and fixes the liquid crystal layer 250 to the substrate 220.

Each of the plurality of liquid crystal capsules 252 is a polymer capsule having a diameter of 1 to 999 nanometers and includes a water soluble material such as poly vinyl alcohol (PVA) or a fat soluble material such as poly methyl methacrylate (PMMA). For example, each of the plurality of liquid crystal capsules 252 may be within a range of about 1 nm to about 320 nm.

The binder 254 may be transparent or translucent (half-transparent) and may have a water solubility, a fat solubility or a mixed property of a water solubility and a fat solubility. For example, the binder 254 may include a water solubility which has a small influence on the liquid crystal capsule 252.

The plurality of liquid crystal molecules 256 may include at least one of a nematic liquid crystal, a ferroelectric liquid crystal and a flexo electric liquid crystal.

Since the liquid crystal layer 250 including the plurality of liquid crystal capsules 252 and the binder 256 may be formed without an additional orientation layer, the liquid crystal layer 250 may directly contact the pixel electrode 238 and the common electrode 240.

An auxiliary adhesive layer 262 is formed on the liquid crystal layer 250. The auxiliary adhesive layer 262 may prevent remaining of a bubble when the substrate 220 and an optical film 260 are attached.

To prevent remaining of a bubble during the step of attaching, a thickness of about 10 μm to about 40 μm is required for the liquid crystal layer 250. However, the liquid crystal layer 250 of a thickness of about 10 μm to about 40 μm does not have a required birefringence property and a required optical transmittance.

Accordingly, the auxiliary adhesive layer 262 not including the liquid crystal capsule 252 is formed on the liquid crystal layer 250 for preventing remaining of a bubble. The auxiliary adhesive layer 262 may include a material the same as the adhesive material of the binder 254 of the liquid crystal layer 250 and may have a thickness of about 8 μm to about 34 μm.

To increase an adhesive force between the liquid crystal layer 250 and the auxiliary adhesive layer 262, the liquid crystal layer 250 and the auxiliary adhesive layer 262 may further include a reactive additive. The reactive additive may be a material having a reactivity to a heat or a light or a material for compensating a refractive index difference between the liquid crystal layer 250 and the auxiliary adhesive 262.

An optical film 260 is formed on the auxiliary adhesive layer 262. The optical film 260 protects the liquid crystal layer 250 including the liquid crystal capsule 252 and may have an optical function.

For example, the optical film 260 may include one of triacetyl cellulose (TAC) and cyclic olefin copolymer (COC) having an optical isotropy or a material capable of compensating a birefringence property of the liquid crystal layer 250.

A first adhesive layer 270 and a first polarizing plate 272 are sequentially formed under the substrate 220, and a second adhesive layer 274 and a second polarizing plate 276 are sequentially formed on the liquid crystal layer 250.

An adhesive force of the first and second adhesive layers 270 and 274 may be smaller than an adhesive force of the auxiliary adhesive layer 262.

The LCD device 210 may be fabricated by attaching the substrate 220 having the TFT T, the color filter layer, the pixel electrode 238 and the common electrode 240 and the optical film 260 having the liquid crystal layer 250.

FIGS. 5A to 5E are cross-sectional views showing a method of fabricating a liquid crystal display device including a liquid crystal capsule according to a second aspect of the present disclosure. Reference is made to FIG. 4 with FIGS. 5A to 5E.

Figure 5A:
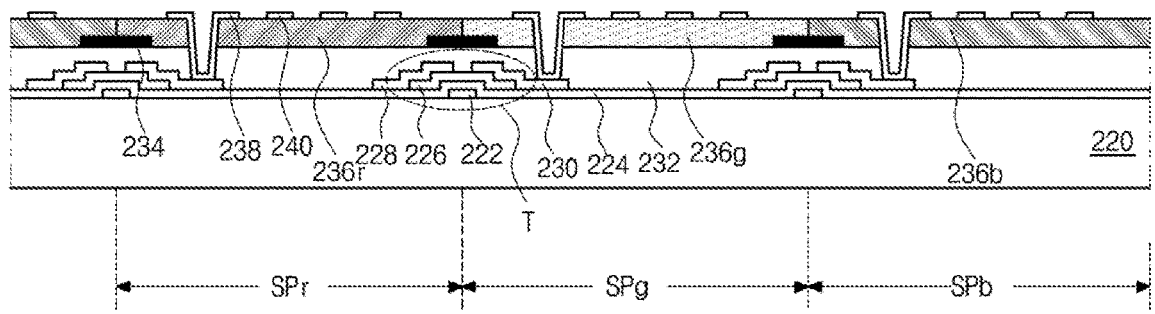
FIGS. 5A to 5E are cross-sectional views showing a method of fabricating a liquid crystal display device including a liquid crystal capsule according to a second aspect of the present disclosure.

In FIG. 5A, the TFT T including the gate electrode 222, the semiconductor layer 226, the source electrode 228 and the drain electrode 230 is formed in each of the first, second and third sub-pixels SPr, SPg and SPb on the substrate 220, and the first, second and third color filters 236r, 236g and 236b are formed in the first, second and third sub-pixels SPr, SPg and SPb, respectively, on the TFT T. The pixel electrode 238 and the common electrode 240 are formed in each of the first, second and third sub-pixels SPr, SPg and SPb, respectively, on the first, second and third color filters 236r, 236g and 236b.

Figure 5B:
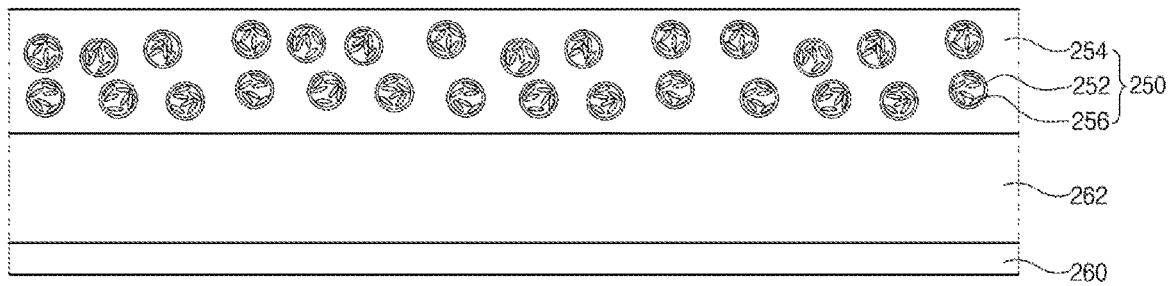

In FIG. 5B, the auxiliary adhesive layer 262 of an adhesive material is formed on the optical film 260. The liquid crystal capsule material layer (not shown) is formed on the auxiliary adhesive layer 262 by coating the liquid crystal capsule solution including the plurality of liquid crystal capsules 252 and the binder 254, and the liquid crystal capsule material layer is dried or cured to form the liquid crystal layer 250.

Each of the plurality of liquid crystal capsules 252 includes the plurality of liquid crystal molecules 256, and the binder 254 includes the adhesive material (not shown). The adhesive material of the liquid crystal layer 250 may be the same as the adhesive material of the auxiliary adhesive layer 262.

For example, the auxiliary adhesive layer 262 may have a thickness of about 8 μm to about 34 μm, and the liquid crystal layer 250 may have a thickness of about 2 μm to about 6 μm.

Figure 5C:
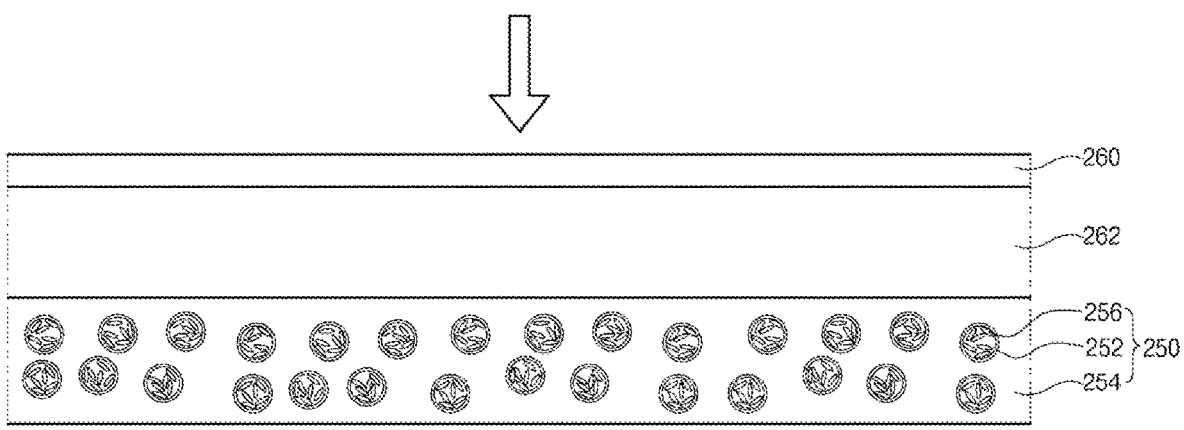
Figure 5C:
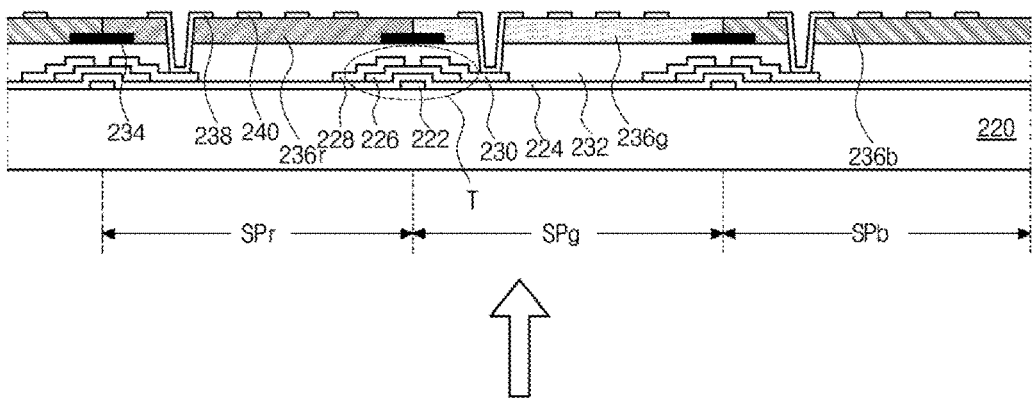

In FIG. 5C, the substrate 220 having the TFT T, the first, second and third color filters 236r, 236g and 236b, the pixel electrode 238 and the common electrode 240 and the optical film 260 having the auxiliary adhesive layer 262 and the liquid crystal layer 250 are attached to each other.

The adhesive material of the binder 254 of the liquid crystal layer 250 may provide the adhesive force between the substrate 220 and the optical film 260.

The auxiliary adhesive layer 262 may prevent remaining of a bubble in an interface between the substrate 220 and the optical film 260 when the substrate 220 and the optical film 260 are attached to each other.

To prevent remaining of a bubble during the step of attaching, a thickness of about 10 μm to about 40 μm is required for the liquid crystal layer 250. However, the liquid crystal layer 250 of a thickness of about 10 μm to about 40 μm does not have a required birefringence property and a required optical transmittance.

Accordingly, instead of forming the liquid crystal layer 250 having a relatively great thickness, the liquid crystal layer 250 is formed to have a normal thickness of about 2 μm to about 6 μm, and the auxiliary adhesive layer 262 of a thickness of about 8 μm to about 34 μm having no liquid crystal capsule 252 is formed between the optical film 260 and the liquid crystal layer 250, thereby the auxiliary adhesive layer 262 and the liquid crystal layer 250 having a thickness of about 10 μm to about 40 μm. As a result, remaining of a bubble between the optical film 260 and the liquid crystal layer 250 is prevented during the step of attaching.

Figure 5D:
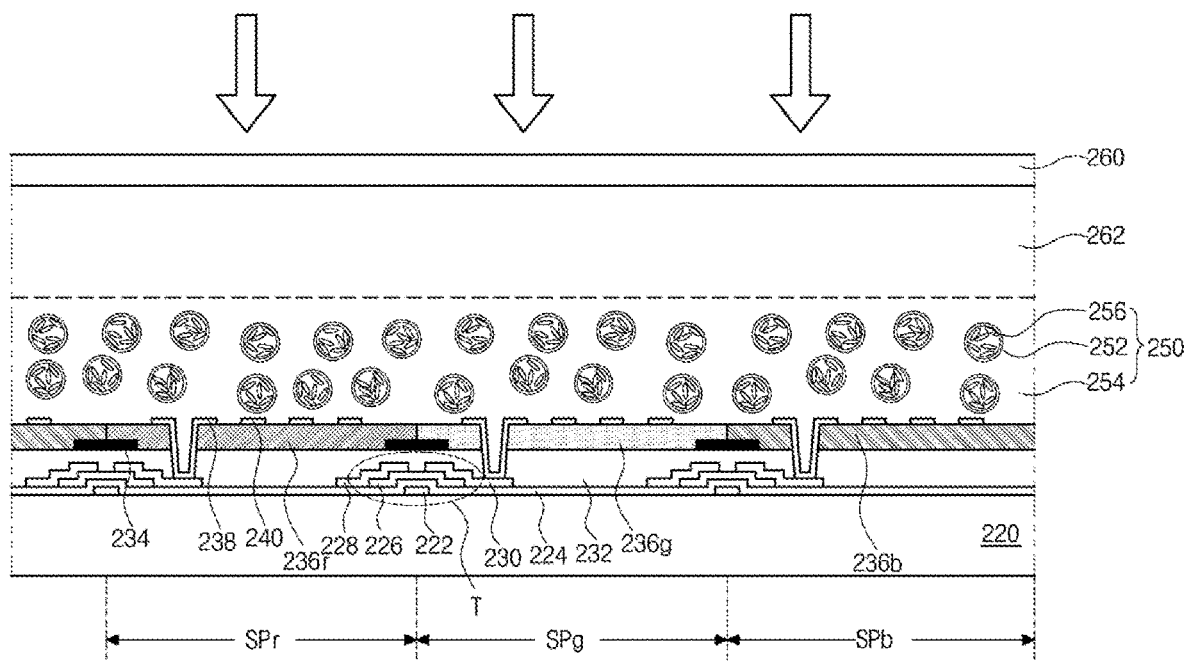

In FIG. 5D, the liquid crystal layer 250 and the auxiliary adhesive layer 262 between the substrate 220 and the optical film attached to each other are cured by using a heat or a light (e.g., ultraviolet (UV) ray).

Since the adhesive material of the liquid crystal layer 250 and the adhesive material of the auxiliary adhesive layer 262 are cured, the adhesive force of the liquid crystal layer 250 and the auxiliary adhesive layer 262 increases. To further increase the adhesive force, the liquid crystal layer 250 and the auxiliary adhesive layer 262 may further include a reactive additive.

When the liquid crystal layer 250 and the auxiliary adhesive layer 262 include the same adhesive material, the liquid crystal layer 260 may become similar to the auxiliary adhesive layer 262 except for the liquid crystal capsule 252. As a result, the interface between the liquid crystal layer 260 and the auxiliary adhesive layer 262 may become blurred.

Figure 5E:
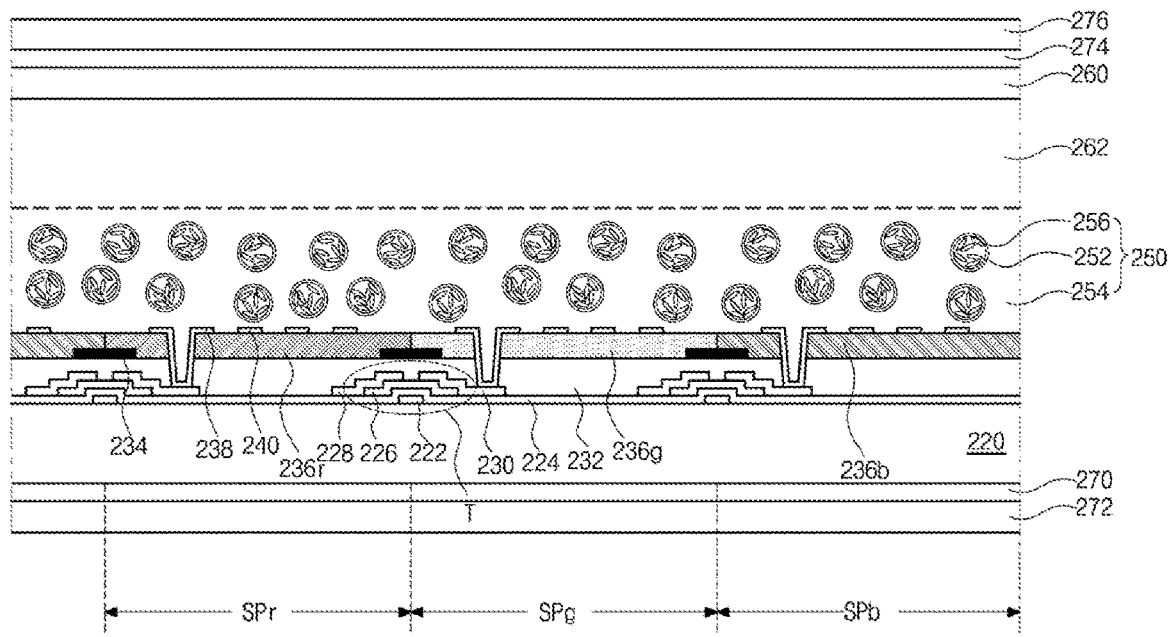

In FIG. 5E, the first polarizing plate 272 is attached to a rear surface of the substrate 220 through the first adhesive layer 270, and the second polarizing plate 276 is attached to a front surface of the optical film 260 through the second adhesive layer 274. As a result, the LCD device 210 including the liquid crystal capsule 252 is completed.

The adhesive force of the auxiliary adhesive layer 262 may be greater than the adhesive force of the first and second adhesive layers 270 and 274 even before the step of curing. After the step of curing, since the adhesive materials of the liquid crystal layer 250 and the auxiliary adhesive layer 262 are cured, the adhesive force of the auxiliary adhesive layer 262 may become further greater than the adhesive force of the first and second adhesive layers 270 and 274.

In the LCD device 210 including the liquid crystal capsule according to the second aspect of the present disclosure, since the adhesive force of the auxiliary adhesive layer 262 is greater than the adhesive force of the first and second adhesive layers 270 and 274, deterioration of the liquid crystal layer 250 during the rework of the second polarizing plate 276 is prevented.

Figure 6:
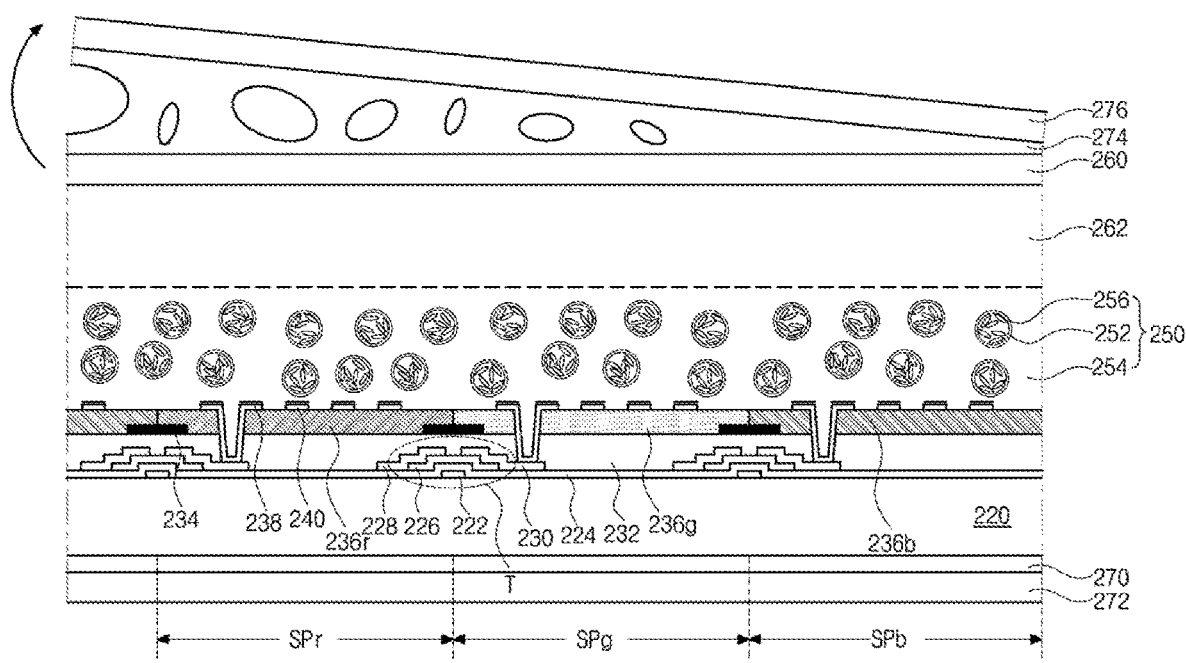
FIG. 6 is a cross-sectional view showing a rework of a liquid crystal display device including a liquid crystal capsule according to a second aspect of the present disclosure.

FIG. 6 is a cross-sectional view showing a rework of a liquid crystal display device including a liquid crystal capsule according to a second aspect of the present disclosure. Reference is made to FIG. 4 with FIG. 6.

In FIG. 6, when the second polarizing plate 276 attached to the optical film 260 through the second adhesive layer 274 is misaligned, the second polarizing plate 276 is removed from the substrate 220 having the liquid crystal layer 250 and the optical film 260 and then a new second polarizing plate 276 is attached to the optical film 260 again.

Since the adhesive force of the liquid crystal layer 250 and the auxiliary adhesive layer 262 is further greater than the adhesive force of the second adhesive layer 274 due to the inherent property of the adhesive material and the additional step of curing, the second adhesive layer 274 and the second polarizing plate 276 may be easily removed from the substrate 220 in a state where the liquid crystal layer 250, the auxiliary adhesive layer 262 and the optical film 260 are attached to the substrate 220. As a result, the rework is smoothly performed without an error and a fabrication cost is reduced.

In the LCD device 210 including the liquid crystal capsule according to the second aspect of the present disclosure, since the auxiliary adhesive layer 262 and the optical film 260 on the liquid crystal layer 250 protects the liquid crystal layer 250, deterioration of the liquid crystal layer 250 due to the adhesive material of the second adhesive layer 274 is prevented and the optical film 260 is applied to various kinds of substrate 220.

In addition, after the liquid crystal capsule solution is formed on the optical film 260, the optical film 260 is attached to various kinds of substrate 220. As a result, a condition change of the liquid crystal capsule solution is not required and the thickness of the liquid crystal layer 250 may be kept uniformly.

Further, since the auxiliary adhesive layer 262 is formed between the liquid crystal layer 250 and the optical film 260, remaining of a bubble is prevented during the step of attaching the substrate 220 and the optical film 260.

Moreover, the adhesive force of the liquid crystal layer 250 and the auxiliary adhesive layer 262 is greater than the adhesive force of the second adhesive layer 274, and the adhesive force of the liquid crystal layer 250 and the auxiliary adhesive layer 262 further increases by the curing.

As a result, separation of the liquid crystal layer 250 and the auxiliary adhesive layer 262 from the substrate 220 is prevented during the rework.

It will be apparent to those skilled in the art that various modifications and variations can be made in the display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A liquid crystal display device, comprising:
   a substrate having first, second and third sub-pixels;
   a thin film transistor in each of the first, second and third sub-pixels on a front surface of the substrate;
   a pixel electrode and a common electrode in each of the first, second and third sub-pixels on the substrate, the pixel electrode and the common electrode spaced apart from each other;
   a liquid crystal layer on the pixel electrode and the common electrode, the liquid crystal layer including a liquid crystal capsule and a binder;
   an auxiliary adhesive layer on the liquid crystal layer;
   an optical film on the auxiliary adhesive layer;
   a first adhesive layer and a first polarizing plate sequentially on a rear surface of the substrate; and
   a second adhesive layer and a second polarizing plate sequentially on the optical film,
   wherein each of adhesive forces of the liquid crystal layer and the auxiliary adhesive layer is greater than an adhesive force of the second adhesive layer.

2. The display device of claim 1, wherein each of the liquid crystal layer and the auxiliary adhesive layer includes a reactive additive having a reactivity to heat or light.

3. The display device of claim 1, wherein the optical film has an optical isotropy or a compensating property for a birefringence of the liquid crystal layer.

4. A liquid crystal display device of claim 1, comprising:
   a substrate having first, second and third sub-pixels;
   a thin film transistor in each of the first, second and third sub-pixels on a front surface of the substrate;
   a pixel electrode and a common electrode in each of the first, second and third sub-pixels on the substrate, the pixel electrode and the common electrode spaced apart from each other;
   a liquid crystal layer on the pixel electrode and the common electrode, the liquid crystal layer including a liquid crystal capsule and a binder;
   an auxiliary adhesive layer on the liquid crystal layer;
   an optical film on the auxiliary adhesive layer;
   a first adhesive layer and a first polarizing plate sequentially on a rear surface of the substrate; and
   a second adhesive layer and a second polarizing plate sequentially on the optical film,
   wherein the binder includes an adhesive material, and the auxiliary adhesive layer includes a same material as the adhesive material of the binder.

5. A method of fabricating a liquid crystal display device, comprising:
   forming a thin film transistor, a pixel electrode and a common electrode in each of first, second and third sub-pixels on a front surface of a substrate, the pixel electrode and the common electrode spaced apart from each other;
   sequentially forming an auxiliary adhesive layer and a liquid crystal layer on an optical film;
   attaching the substrate and the optical film such that the pixel electrode and the common electrode contact the liquid crystal layer;
   sequentially forming a first adhesive layer and a first polarizing plate on a rear surface of the substrate; and
   sequentially forming a second adhesive layer and a second polarizing plate on the optical film,
   wherein each of adhesive forces of the liquid crystal layer and the auxiliary adhesive layer is greater than an adhesive force of the second adhesive layer.

6. The method of claim 5, further comprising curing the liquid crystal layer and the auxiliary adhesive layer between the substrate and the optical film by using heat or light.

7. The method of claim 5, wherein the forming the liquid crystal layer on the optical film includes:
   forming a liquid crystal capsule material layer on the auxiliary adhesive layer by coating a liquid crystal capsule solution including a liquid crystal capsule and a binder; and
   forming the liquid crystal layer by one of drying and curing the liquid crystal capsule material layer.

8. A liquid crystal display device including a thin film transistor substrate where first, second and third sub-pixels are defined, comprising:
   a thin film transistor in each of the first, second and third sub-pixels on a front surface of the thin film transistor substrate;
   a liquid crystal layer disposed on the thin film transistor, the liquid crystal layer including a liquid crystal capsule and a binder;
   an auxiliary adhesive layer on the liquid crystal layer;
   an optical film on the auxiliary adhesive layer;
   a first adhesive layer and a first polarizing plate sequentially on a rear surface of the thin film transistor substrate; and
   a second adhesive layer and a second polarizing plate sequentially on the optical film,
   wherein each of adhesive forces of the liquid crystal layer and the auxiliary adhesive layer is greater than an adhesive force of the second adhesive layer.

9. The display device of claim 8, wherein each of the liquid crystal layer and the auxiliary adhesive layer includes a reactive additive having a reactivity to heat or light.

10. The display device of claim 8, wherein the optical film has an optical isotropy or a compensating property for a birefringence of the liquid crystal layer.

11. A liquid crystal display device including a thin film transistor substrate where first, second and third sub-pixels are defined, comprising:
    a thin film transistor in each of the first, second and third sub-pixels on a front surface of the thin film transistor substrate;
    a liquid crystal layer disposed on the thin film transistor, the liquid crystal layer including a liquid crystal capsule and a binder;
    an auxiliary adhesive layer on the liquid crystal layer;
    an optical film on the auxiliary adhesive layer;
    a first adhesive layer and a first polarizing plate sequentially on a rear surface of the thin film transistor substrate; and
    a second adhesive layer and a second polarizing plate sequentially on the optical film,
    wherein the binder includes an adhesive material, and the auxiliary adhesive layer includes a same material as the adhesive material of the binder.

12. A method of fabricating a liquid crystal display device, comprising:

forming a thin film transistor, a pixel electrode and a common electrode in each of first, second and third sub-pixels on a front surface of a substrate, the pixel electrode and the common electrode spaced apart from each other;

sequentially forming an auxiliary adhesive layer and a liquid crystal layer on an optical film;

attaching the substrate and the optical film such that the pixel electrode and the common electrode contact the liquid crystal layer;

sequentially forming a first adhesive layer and a first polarizing plate on a rear surface of the substrate; and sequentially forming a second adhesive layer and a second polarizing plate on the optical film, wherein the binder includes an adhesive material, and the auxiliary adhesive layer includes a same material as the adhesive material of the binder.

* * * * *